July 5, 1927.
S. B. LAMBERT
1,634,948
ATTACHMENT FOR CLUTCHES
Filed Nov. 9, 1925
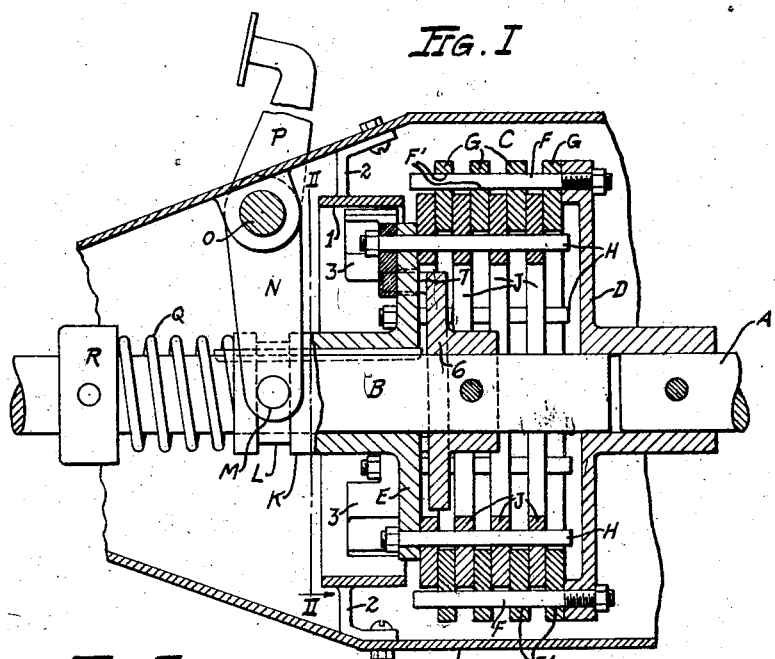
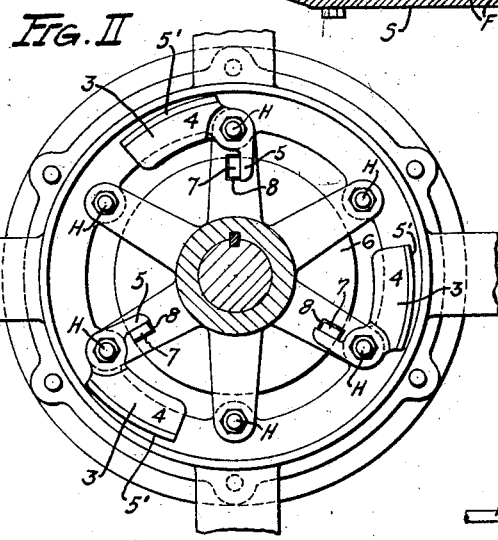
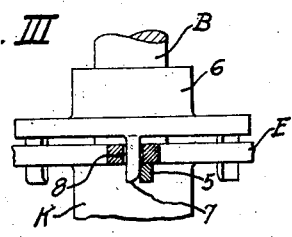
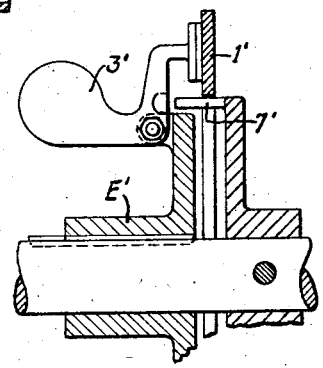
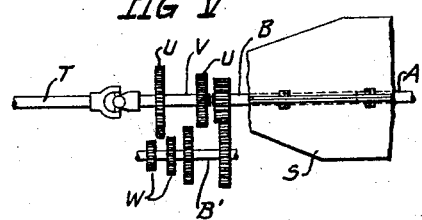
INVENTOR
S. B. LAMBERT
BY Cook & McCauley
ATTORNEYS Patented July 5, 1927.

UNITED STATES PATENT OFFICE.

SAMUEL B. LAMBERT, OF ST. LOUIS, MISSOURI.

ATTACHMENT FOR CLUTCHES.

Application filed November 9, 1925. Serial No. 67,817.

This invention relates generally to attachments for clutches, and particularly to an attachment for a clutch mechanism of the type used on motor vehicles and having a portion capable of rotating freely immediately after said clutch mechanism has been placed in a disengaged condition. The main object of the invention is to provide a clutch of the type described with means whereby the period of time during which a portion of said clutch mechanism rotates freely after the disengagement of the clutch mechanism is considerably reduced, thus providing for more rapid and less noisy shifting of the speed-changing gears of the motor vehicle.

In driving motor vehicles of the type having speed-changing gears which are shifted by means of a hand-operated lever it is necessary to disengage the clutch before shifting from one speed to another, and when the clutch is disengaged and the gear-shifting lever has been moved to the neutral position a portion of the clutch mechanism, together with the secondary shaft and associated gears of the transmission, are capable of rotating freely for a period of time. Prior to this invention it was necessary in most cases for the motor vehicle operator who desired to shift the transmission gears to change from one speed to another to wait until the speed of the freely rotating portions of the clutch mechanism and transmission had been reduced sufficiently to permit the gears to be shifted into mesh, and because of this wait the speed of the vehicle was reduced and the smooth operation thereof interfered with.

I am aware that devices have been associated with clutches which devices operated to cause friction to be applied to the freely rotating portions of the clutches and transmissions, but these devices were faulty in that the same pressure was applied to said freely rotating parts regardless of the speed thereof. In other words, if the vehicle were traveling at a rate of speed equal to five miles an hour when the clutch was disengaged, the same pressure would be applied to the freely rotating parts that would be applied if the speed of travel of the vehicle were at the rate of forty miles an hour at the moment the clutch was disengaged. It is apparent, therefore, that if a certain pressure would reduce the length of time of free rotation of the parts when the vehicle had been traveling at a rate of speed equal to forty miles an hour the same pressure applied when the clutch was disengaged when the vehicle was traveling at five miles an hour would be excessive, and instead of a gradual retarding of the speed of rotation of the parts, said parts would in all probability be brought to a sudden stop.

The attachment disclosed in the present application was designed to eliminate the objections recited above, and its predominant feature resides in the fact that the amount of pressure applied to the freely rotating parts of the clutch when said clutch is disengaged is regulated by the speed of rotation of said parts, and therefore said rotating parts are retarded sufficiently to permit rapid shifting of gears in approximately the same period of time regardless of the speed of travel of the vehicle at the moment the clutch is disengaged.

With the foregoing and other objects in view, the invention comprises the novel construction, combination and arrangement of parts hereinafter more specifically described and illustrated in the accompanying drawings, wherein is shown the preferred embodiment of the invention. However, it is to be understood that the invention comprehends changes, variations and modifications which come within the scope of the claims hereunto appended.

Fig. I is a fragmentary vertical section through a multiple disk clutch provided with my improved attachment.

Fig. II is a section on line II—II of Fig. I looking in the direction indicated by the arrow.

Fig. III is a detail showing the arrangement of the arms by means of which the friction members are disengaged from the drum when the clutch mechanism is in an engaged condition.

Fig. IV is a fragmentary detail showing a modified form of my invention.

Fig. V is a diagrammatic view showing the arrangement of my attachment with relation to the transmission of a motor vehicle.

In the drawing, A designates the engine shaft of a motor vehicle and B the transmission shaft thereof. The engine shaft A and transmission shaft B are, of course, independently operable, and C designates a clutch whereby said engine shaft and transmission shaft may be connected together so as to provide for the transmission of motion from said engine shaft to said transmission shaft. The clutch C illustrated in the drawing is of the multiple disk type and comprises a member D, which may be in the form of a spider and which is secured to the engine shaft A and rotates therewith. A similar member E is mounted on the transmission shaft B and is arranged to slide longitudinally thereof. F designates a plurality of rods which are carried by the member D and are arranged parallel with the transmission on shaft B. Arranged intermediate of the members D and E is a plurality of plates G, which are supported by the rods F and are spaced apart from each other in a horizontal direction. The plates G are each annular in form and are each provided with apertures F' through which the rods F pass. Secured to the member E and extended therefrom in a direction parallel with the transmission shaft B is a plurality of rods H. The rods H support a plurality of plates J, and each of said plates, excepting the one immediately adjacent to the member E, is located intermediate of a pair of plates G, and said plate J adjacent to the member E is intermediate of one of said plates G and said member E.

The member E is provided with a hub portion K which surrounds the transmission shaft B and has an annular groove L formed therein, said annular groove being adapted to receive pins M supported by the lower end portions of a lever N. The lever N is fixed to and depends from a rockable shaft O to which the clutch pedal P of the motor vehicle is secured. Q designates a coil spring which is interposed between an end of the hub portion K of the member E and a collar R fixed to the transmission shaft B, said coil spring being adapted to urge the member E toward the member D.

In the operation of the clutch C the coil spring Q will force the side faces of the plates J into firm frictional contact with the side faces of the plates G, whereby said plates J and G will rotate as a unit, thus transmitting motion from the engine shaft A to the transmission shaft B. However, if the foot pedal P be depressed, the member E will be moved rearwardly against the action of the spring Q, thus permitting the plates J and G to separate, whereby the plates G may rotate without imparting motion to the plates J.

The foregoing briefly describes a well known type of clutch with which my attachment may be used. However, it is to be understood that the particular clutch shown and described does not form a part of my invention, and it is obvious that my attachment may be associated with various types of clutches now on the market or which may subsequently appear thereon.

Referring now to my improved attachment, 1 designates a stationary drum which may be secured in place in any suitable manner, for instance, by being secured by means of arms 2 to the housing S surrounding the clutch C, as shown in Fig. I. The drum 1 is so arranged that it surrounds the member E. Pivotally secured to the member E is a plurality of friction members 3, said friction members being pivotally supported by certain of the rods H as shown in Figs. I and II. The friction members 3 comprise each a weighted portion 4 and a downturned tail portion 5, and said weighted portions 4 of said friction members are arranged immediately adjacent to the inner face of the drum 1 (Fig. II). Arranged on the outer face of each weighted portion 4 of the friction members 3 is a layer of friction material 5'.

Fixed to the transmission shaft B and rotatable therewith is a member 6 provided with a plurality of arms 7, there being one of said arms associated with each individual friction member 3 and said arms being extended through apertures 8 in the member E and being arranged immediately adjacent to the tail portions 5 of the friction members 3. By referring to Fig. III it will be seen that the arms 7 and the tail portions 5 of the friction members 3 are provided with curved faces, and the purpose of these curved faces will be hereinafter set forth.

To explain the operation of a motor vehicle provided with a clutch having one of my improved attachments associated therewith it will be assumed that said motor vehicle is traveling in low speed and that the operator desires to shift the gears so as to cause said vehicle to travel in second speed. When the vehicle is traveling in low speed, the speed of rotation of the engine shaft A, transmission shaft B and the secondary transmission shaft B' in Fig. V is very fast, while the speed of rotation of the drive shaft T, which is connected directly to the ground wheels of the vehicle, is comparatively slow. To shift the gears U on the shaft V into mesh with the gears W on the shaft B' with the minimum amount of noise, it is necessary that said shafts B' and V be rotating at approximately the same speed, and it is this condition that my improved attachment brings about with the least possible delay. When the operator desires to shift from a low speed to a higher speed he first disengages the clutch, after which he moves the gear-shifting lever to the neutral position. This will permit the transmission shaft B and the secondary transmission shaft B' to spin idly, due to momentum, and if no means were provided to prevent it these perfectly balanced parts would rotate for some time. However, with my attachment in place on the clutch the movement of the member E longitudinally of the shaft B when the clutch is disengaged will cause the tail portions 5 of the friction members 3 to be moved away from the arms 7, due to the fact that said friction members are supported by and move with said member E. As soon as the tail portions 5 are free of the ends of the arms 7 centrifugal force will cause the weighted portions 4 of the friction members 3 to move outwardly, so that the layers of friction material on said weighted portions will contact firmly with the inner face of the drum 1, and as said friction faces are drawn along the inner face of the drum 1 the speed of rotation of the freely rotating parts of the clutch and transmission will be retarded.

It is plain, in view of the construction set forth above, that the speed of rotation of the member E and the shafts associated therewith regulate the amount of pressure exerted by the friction members 3 against the inner face of the drum 1, for the reason that the outward swing of said friction members 3 will be in proportion to the speed of said elements. Consequently just enough pressure will be applied by the friction members 3 to the inner face of the drum to gradually retard the rotating parts sufficiently in a fixed period of time to permit the rapid shifting of gears regardless of the speed of the member E; in other words, the free rotation of the parts of the clutch and transmission will be retarded sufficiently to permit shifting of the gears in approximately the same period of time regardless of the speed of the vehicle just previous to the disengagement of the clutch, due to the fact that the pressure of the friction members 3 against the inner face of the drum 1 will be greater when the speed of rotation of the rotating parts is high and proportionately less as the speed of rotation of the rotating parts is reduced.

When the member E is permitted to be moved toward the member D by the spring Q to permit engagement of the clutch C the curved faces of the tail portions 5 of the friction members and the arms 7 will meet, and as said curved faces slide relative to each other the weighted ends 4 of said friction members will be drawn away from the inner face of the drum 1 and said weighted portions of said friction members will be held away from said inner face of the drum by said arms 7 while the clutch is in engagement.

In Fig. IV I illustrate a modified form of my invention, wherein a flat plate 1' instead of a drum is employed. In the form of the invention shown in Fig. IV, arms 7' are employed to force the friction faces of the friction members 3' away from the plate 1' when the clutch is engaged, and said friction members are supported by a slidable member E' just as in the preferred construction of my invention.

In describing the operation of a clutch provided with my improved attachment, only the operation of shifting from a low speed to a higher speed is described, but it is to be understood that the operation of my attachment is the same when the speed of a vehicle is changed from a higher speed to a lower one.

I claim:

1. In combination with a clutch having a portion capable of free rotation when said clutch is disengaged, a pivoted friction device supported by and rotatable with said freely rotatable portion, a stationary element, said pivoted friction device being thrown outwardly by centrifugal force when said clutch is disengaged and into contact with said stationary element whereby the speed of rotation of said freely rotating portion of the clutch is retarded, and means whereby said friction device is withdrawn from contact with said stationary element when the clutch is engaged, said means comprising an arm with which said pivoted friction device is caused to contact.

2. A clutch comprising a rotatable shaft, a member arranged on said shaft and adapted to rotate with and move longitudinally thereof, a pivoted friction member supported by said member and adapted to rotate therewith, said pivoted friction member being provided with a weighted end portion, a stationary element, said pivoted friction member being thrown outwardly by centrifugal force when said clutch is disengaged so that it contacts with said stationary element to retard the speed of rotation of the member on which said friction member is mounted, and means whereby said pivoted friction member may be withdrawn from contact with said stationary element when said clutch is engaged, said means comprising an arm into engagement with which said friction member is moved when said clutch is moved into engagement, said arm being adapted to move said friction member out of engagement with said stationary element when it is engaged by said friction member.

In testimony that I claim the foregoing I hereunto affix my signature.

SAMUEL B. LAMBERT.